United States Patent
Nicholl et al.

(10) Patent No.: US 7,680,947 B2
(45) Date of Patent: Mar. 16, 2010

(54) SYSTEM AND METHOD FOR COLLABORATING EMERGENCY RESPONSE EFFORTS THROUGH MULTIMEDIA DATA DISSEMINATION

(75) Inventors: David Henry Nicholl, Kansas City, MO (US); Laura Ellen Owen, Olathe, KS (US); Jan Carl Bilinski, Kansas City, MO (US)

(73) Assignee: ICOP Digital IN, Lenexa, KS (US)

( * ) Notice: Subject to any disclaimer, the term of this patent is extended or adjusted under 35 U.S.C. 154(b) by 189 days.

(21) Appl. No.: 11/558,821

(22) Filed: Nov. 10, 2006

(65) Prior Publication Data

US 2008/0115174 A1      May 15, 2008

(51) Int. Cl.
*G06F 15/16* (2006.01)
(52) U.S. Cl. .................. 709/231; 709/224; 709/225; 709/226; 709/230; 713/151; 713/152; 380/37
(58) Field of Classification Search ........ 709/231, 709/230, 224, 225, 226; 713/151, 152; 380/37
See application file for complete search history.

(56) References Cited

U.S. PATENT DOCUMENTS

| | | | |
|---|---|---|---|
| 6,502,137 B1* | 12/2002 | Peterson et al. | 709/229 |
| 7,002,995 B2* | 2/2006 | Chow et al. | 370/485 |
| 7,436,955 B2* | 10/2008 | Yan et al. | 380/37 |
| 2003/0037104 A1* | 2/2003 | Okamura | 709/203 |
| 2006/0224763 A1* | 10/2006 | Altunbasak et al. | 709/231 |
| 2006/0256822 A1* | 11/2006 | Kwong et al. | 370/503 |

* cited by examiner

*Primary Examiner*—Thanh Tammy Nguyen
(74) *Attorney, Agent, or Firm*—Ladi O Shogbamimu

(57) ABSTRACT

The present invention is directed to an apparatus and associated method for the sharing and communication of video and other surveillance related multimedia data by streaming video and other data from an emergency response unit to a variety of devices and other emergency response units. Surveillance data obtained through a variety of monitoring options, including sources external to the first response unit is wirelessly disseminated from that first response patrol car or similar emergency response unit, to any number of other devices on a digital network.

10 Claims, 2 Drawing Sheets

SYSTEM AND METHOD FOR COLLABORATING EMERGENCY RESPONSE EFFORTS THROUGH MULTIMEDIA DATA DISSEMINATION

The present invention is generally directed to an apparatus and an associated method for the sharing and communication of video and other captured related multimedia data, and relates more particularly to the of streaming video from an emergency response unit to one or more varieties of mobile playing devices. Surveillance or on-the-scene, data obtained through a variety of monitoring options is wirelessly disseminated from a patrol car or similar emergency response unit to any number of other playing devices on a digital network. Video data is streamed wirelessly in real-time from the patrol car to the destination device(s).

BACKGROUND OF THE INVENTION

Security issues and other motivations for surveillance continue to drive wide scale deployment of systems that can provide monitoring in vehicles, buildings, parking lots and other areas. In some of these systems it is necessary to transmit acquired information to central monitoring locations, emergency response vehicles or to other devices. It is also the case that in some situations, it would be advantageous to have the ability to provide remote monitoring or access to non-party entities. Such non-party entities include law enforcement or emergency service agencies. Current systems are typically closed systems and tend to have proprietary communication schemes and thus provide limited access to data. These closed systems do not lend themselves to scalable widespread deployment or provide the opportunity for open access communication.

It is desirable to have a system that can acquire a wide variety of multi-media and environmental data, and secure such data so that it can be transmitted over a communication channel that may not have a large bandwidth. More specifically, it is desirable to have a system that enables wireless transmission of audio/video information to provide a more complete impression of a particular scene or emergency situation. Even further, it would be advantageous to have the ability to share among response units that are present at the scene of an incident, data that has been acquired by the first responding unit or any of the other response units in the vicinity.

While there are existing devices that transmit "live" over the internet or at least reasonably close to real-time, the vast majority of these devices are not of a commercial grade and thus tend to lack the resolution, security or refresh rate that would meet the demands of a satisfactory real-time streaming of video monitoring/surveillance systems for law enforcement. Even further, these devices are not suitable for, nor do they provide means for, enabling video streaming from one patrol car to other units.

There exists a need for a system that will provide improved data compression and networking capability for monitoring systems without necessitating large memory usage or large computational powers.

Existing technology in the realm of video surveillance and the application of such technology to enhance law enforcement or address and/or enhance law enforcement or emergency response functions have been very limited. This is particularly the case in the wireless arena and more specifically with respect to wirelessly sharing video data in real-time between response units at a scene. It would be advantageous to make data that is available to one mobile response unit, also available to others at the scene. Based on current practices and technology, when a patrol car for example has video or other multimedia data, that data at best can be transferred via some portable media, such as Digital Video Disk, Video Cassette Recorder tape, Compact Disk or in some instances a removable drive. Attempts to provide such information using technologies such as the internet or other network schemes have been limited for a number of reasons.

In order to stream video over the internet or any network a number of issues relating to the fact that these networks were not originally designed for streaming technologies need to be resolved. For example, because the internet is a shared medium that utilizes a best effort delivery mechanism, i.e. Internet Protocol (IP), to deliver content, it is not natively conducive to video streaming. The internet has no dedicated path between a source node and a destination node, thus packets of data are routed independently to the destination and may arrive in random orders, which would affect video streaming. Even further, the limited bandwidth of the internet connection may also present a bottleneck in video delivery. As such, much effort has gone into compressing data for video streaming. Some of these issues are further compounded when the connection between the source and destination involves wireless links.

What is needed is on-the-scene video capture and data sharing. In other words, one police squad car may acquire video data from an in-vehicle camera or other source that is pertinent to all responding units. The ability for the officer in that squad car to view and share what is being acquired with other officers at the scene or back at the precinct would enable tremendous collaboration, coordination, support and oversight. Ordinarily, patrol/squad cars or other emergency response units communicate and exchange audio information. The ability to also share visual information in real-time would provide some significant advantages as earlier identified. An efficient and timely exchange of information in the field would also enhance officer safety, situation assessment, response times and the resolution of problematic situations.

BRIEF SUMMARY OF THE INVENTION

The present invention is directed to sourcing and delivering in a secure manner, multimedia data from one emergency response unit to one or more other units over a wireless network.

In one aspect, the present invention is directed to a system for providing secure streaming multimedia data via a wireless network from a first response unit such as a patrol car, to one or more remote playing devices in response to a trigger. The system utilizes an analog to digital converter to covert analog video signals. The digital signals are then encoded and packetized for wireless transmission to other response units utilizing any one of a number of wireless network configurations.

In another aspect, the present invention is directed to a utilizing an EVDO router to interface with the internet and route streaming video data among the various response units.

In a further aspect, the present invention is directed to utilizing a mesh network comprising a collection of wireless access points to disseminate the data among the various response units.

In an even further aspect the present invention is directed to utilizing an adhoc wireless network to stream video among the response units.

In a further aspect, the present invention is directed to providing the capability to switch between various wireless networks for the transmission of the streaming video.

BRIEF DESCRIPTION OF THE DRAWINGS

The present invention is further described with reference to the accompanying drawings, which show a particular construction of the present invention. However, it should be noted that the invention as disclosed in the accompanying drawings is illustrated for the purpose of explanation only. The various elements and combinations of elements described below and illustrated in the drawings can be arranged and organized differently to result in constructions which are still within the spirit and scope of the present invention. Other objects and advantages of the present invention will become apparent to one skilled in the art when the description is read in conjunction with the following drawings, in which.

DETAILED DESCRIPTION OF INVENTION

The present invention is directed to a multi-media monitoring and surveillance apparatus for use in a plethora of situations. The apparatus operates in conjunction with one or more data collection stations, remote viewing stations, communication devices and other security related components. More specifically, the invention provides collection, processing, transmission and sharing of informational items relevant to the monitoring of an area. Acquired information is encoded and packetized utilizing components and methods that provide ease of dissemination and sharing while maintaining data/information integrity. In an embodiment of the present invention, the monitoring/surveillance device is embodied in a combination of hardware and/or software components. The device is also capable of operating on a computing device such as a laptop computer.

Figure 1:
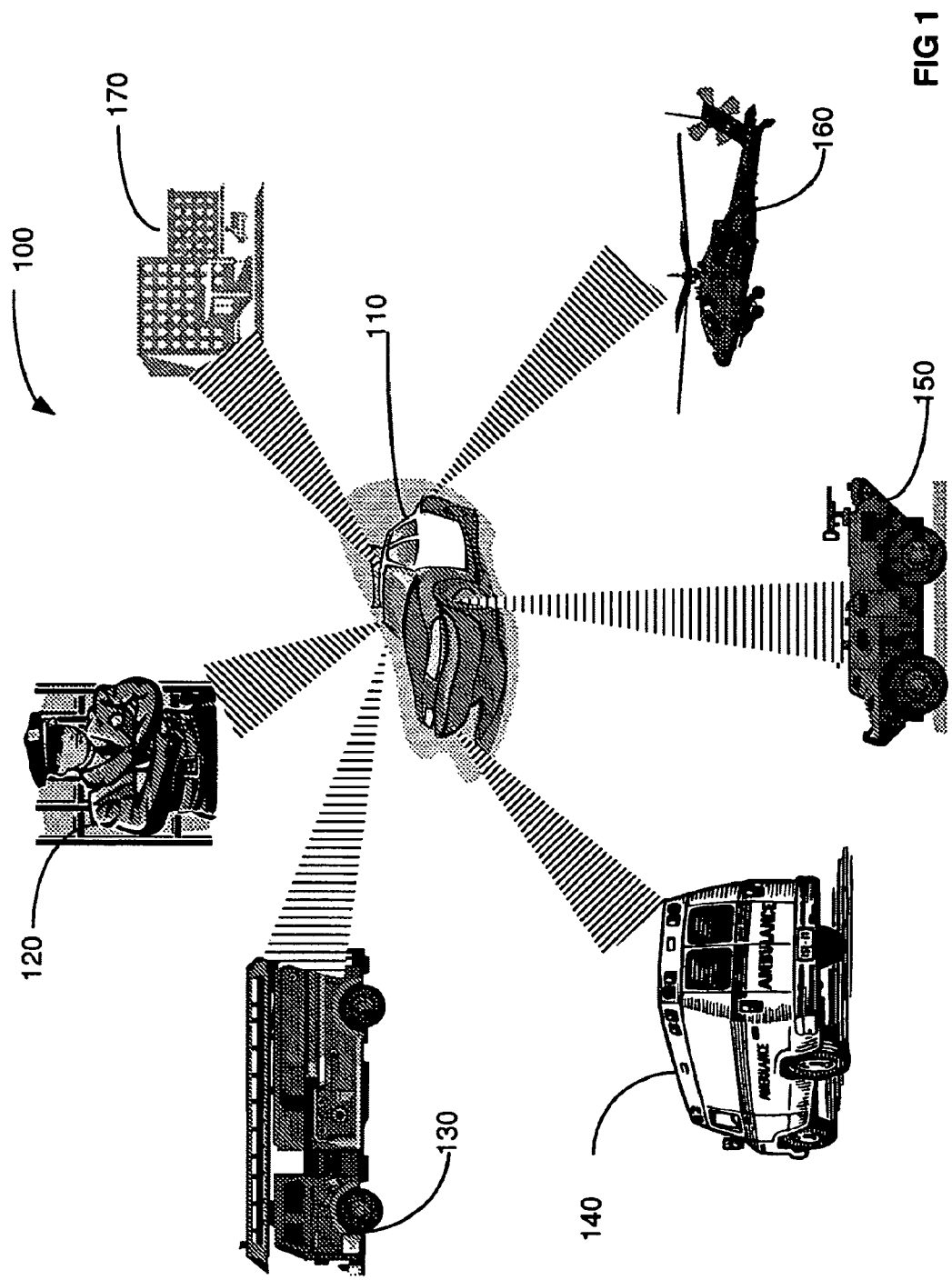
FIG. 1 is an illustration of the system and method of the present invention providing streaming video to a number of emergency response units.

An exemplary illustration of an operational environment for the dissemination of multimedia data according to the present invention is illustrated in FIG. 1, and generally designated as emergency scene 100. As would be appreciated by one skilled in the art, the components shown and their proximity to one another in the scene 100 is merely illustrative and is not intended to limit the application or scope of the present invention to the illustrated components or illustrated wireless/radio connectivity.

As shown, the scene 100 may include a police vehicle, which for the purpose of the discussions in this document will be referred to as a first response unit 110. Located in the first response unit 110 is a device (originating device 200 shown in FIG. 2) for acquiring or capturing data from the scene 100. The captured data may then be provided to other vehicles, personnel or other relevant units. The term captured data, unless specifically identified otherwise, is used interchangeably herein to mean data that is captured by a source component located within the first response unit 110 or data that originates from a source component that is external to the unit 110. In other words, captured data that provided from the first response unit 110 may be: a real-time feed from a live media capture device that is located in the first response unit 110; feed from a live media capture device located in a facility at a scene of interest; or data that was previously stored or recorded. Although the discussions herein are reference video images and data, it should be understood that the system and method of the present is equally applicable to a variety of multimedia information and data.

Ordinarily, in response to an emergency situation, it is likely that there may be multiple responding agencies and units. For example, in addition to the first response unit 110, there may also be one or more field personnel 120, fire trucks 130, ambulances 140, swat team vehicles 150, helicopters 160 and a command post unit 170. These other responders are collectively referred to in this document as 'other response unit' 190. The command post 170 may be a mobile post, a police station or any building utilized as a communication hub and may be located several miles away from the scene 100. As would be appreciated by one skilled in the art, any one or more of the response units 190 could be part of a different number of responding agencies, including the police department, the fire department, National Guard or any Federal agencies.

The system and method of the present invention enables and facilitates communication between the first response unit 110 and one or more other response units 190. More specifically, the present invention provides for the sharing of streaming video among the various responders. Communication between the first response unit 110 and each of the other response units 190 occurs over a secure wireless connection. As illustrated, field personnel 120, fire truck 130, ambulance 140, swat team 150, helicopter 160 and command post 170 each have specific communication links 180a-180f, respectively. The communication links 180a-180f are collectively referenced hereinafter as wireless connections 180. The wireless connections 180 are part of a heterogeneous collection of network types, which are described later in this document.

In operation, communication is enabled from the first response unit 110 when the appropriate security criteria and communication initiation procedures have been satisfied and when the intended other participant, i.e. other response unit 190, is in the proximity of the communication radius for its network type. A connection 180 is established between the first response unit 110 and at least one other response unit 190 for the streaming of video and communication of other data.

Having described the operational environment for the implementation of the present invention, the specific details of one embodiment of the present invention will next be discussed. The details include a description of the components and methodology for providing and accessing streaming video.

Figure 2:
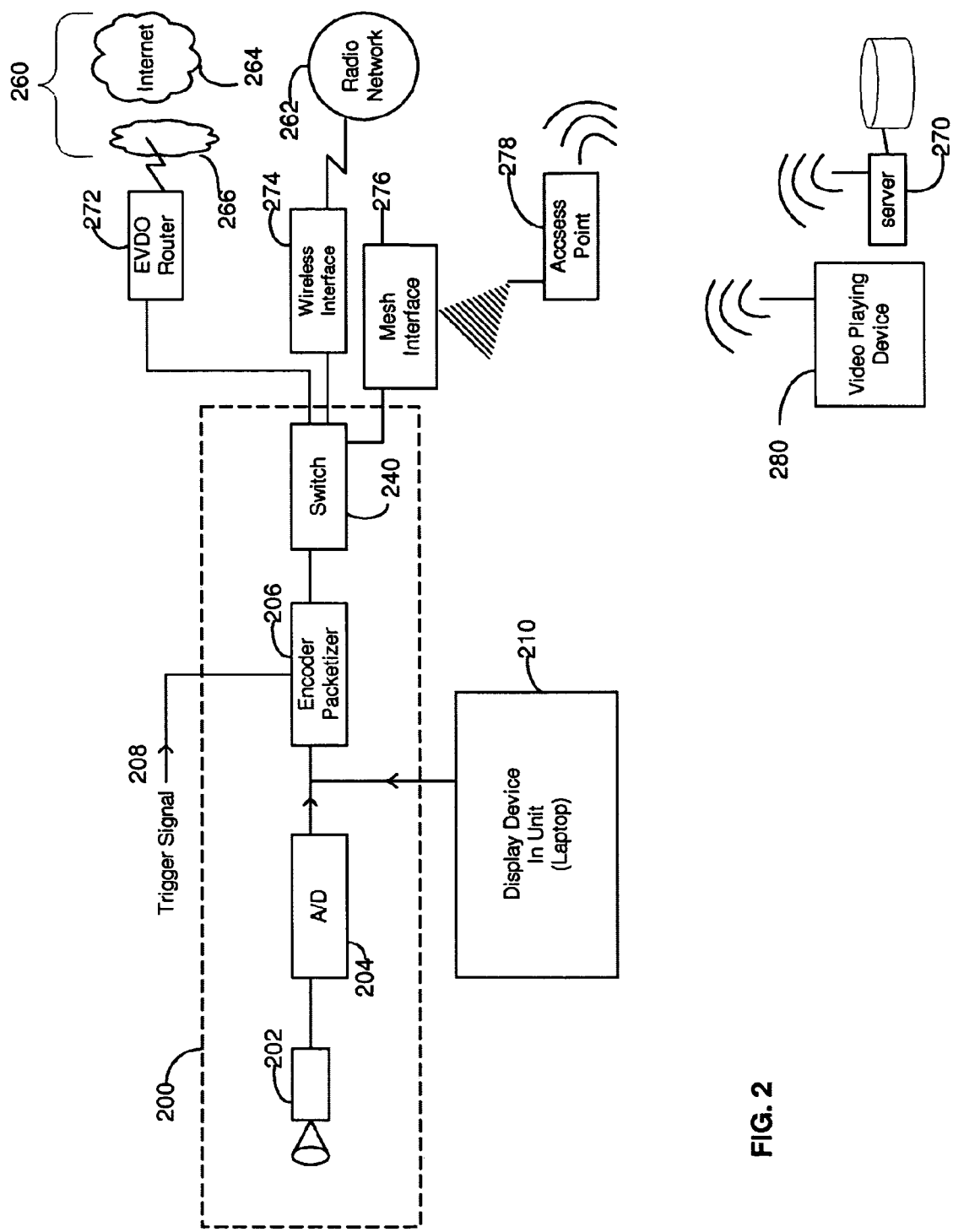
FIG. 2 is an illustrative block diagram of exemplary components to implement the system and method of the present invention.

Exemplary components to implement the present invention are illustrated in FIG. 2. An originating device 200, comprising a capture device 202 such as a camera, an Analog/Digital (A/D) converter 204, and encoder/packetizer 206 and a communication switch 240, is at the core of the present invention. The communication switch 240 may alternatively be coupled to or integrated with playing devices 210, 280. The capture device 202 acquires video images utilizing any one of a number of known methodologies. The capture device 202 may also be a video camera or multi-media capture device such as described in jointly assigned U.S. patent application Ser. No. 11/537,685, which is hereby incorporated by reference in its entirety.

In an embodiment of the present invention, the capture device 202 is coupled to the A/D converter 204 to provide the captured images in a digital format. The digitized image data is then encoded and packetized by an encoder 206 into secure packets for transmission.

In one embodiment of the present invention, a trigger signal 208 initiates the encoding and packetizing of the digitized data. Alternatively, and particularly when the encoder 206 is integrated into a video camera the trigger signal 208 merely enables or initiates the transmission of the secure digital packets. A display unit 210, such as a laptop computer or other device having video playing capability, may be located in the first response unit 110. Advantageously, the display unit 210 may operate in two different configuration modes, which may be selectable at design time or run time. In a first configuration, the display unit 210 may receive digital data prior to the packetization as illustrated. In a second and an alternate configuration, the display 210 may receive secure data packets after encoding and packetizing have occurred. The first configuration provides the advantage of avoiding the utilization resources that are involved in the encoding process and eliminating any time delay that may be associated with that process. The second configuration, while being more resource intensive, has the advantage of eliminating any potential disparities between the information that is viewed locally in the first response unit 110 and that which is streamed to the remote other response units 190.

The communication switching means 240 is provided in the originating device 200 for selecting a network 260 that will be utilized in the dissemination of the streaming video data. In other words, the first response unit 110 having an originating device or otherwise, may be outfitted with one or more interfaces that allow the use of different networks 260. Likewise, playing devices 280 located in other responding unit 190 may also include a switch 240 and interface devices for the same purpose. The switch 240 enables selection of a network as appropriate for either the required distance of a transmission or the situation at the scene 100.

The term networks 260 is used interchangeably herein to mean the entire collection of networks as shown or any segment thereof i.e. Wireless LAN 262, Wireless WAN (not shown), Internet 264, cellular network 266, and mesh network 268, unless specifically identified otherwise. The network 260 may include a server 270 in operative communication with the local display device unit 210, the remote other response units 190 and any number of other 'client' devices. The communication server 270 may serve as a central repository for data obtained from the first response unit 110. The server 270 may also operate in anyone of a number of roles typical of a traditional client-server environment. The first response unite 110 may also store data locally and perform other sophisticated functions or merely be used in a 'view' mode to view data in real time and receive alarm notifications.

Connectivity to the network 260 via the switch 240 is provided by a router or other interface that is specific to each network 260. An EVDO router 272 provides connectivity to the internet 264 via a cellular network 266. A wireless interface device 274 provides connectivity to the wireless LAN/WAN 262. A mesh interface 276 enables access to access points 278 that comprise the mesh network 268. A remote playing device 280 having an appropriate interface to connect to the networks 260 is then able to establish a link (i.e. connection 180 shown in FIG. 1) and receive or access streaming video, provided that all the security authentication been duly satisfied.

The remote playing device 280 may be located in any one or more of the other response units 190 shown in FIG. 1. It should be also be noted that the remote playing device 280 may also be one that is carried on the person of an individual officer, earlier referenced as field personnel 120.

As shown in FIG. 1 and earlier described, the originating device 200 which may be located in the first response unit 110 provides streaming video to one or more remote playing devices 280. Playing devices 280 when located in the other response units 190 enables the sharing of video in real time among a plurality of responding personnel and agencies. In other words, the geographic location of the other responding units 190 or that fact that there could be multiple agencies represented at a scene 100 is made transparent for the purpose of access to relevant field/scene data.

Information that is available from the originating device 200 to a first response unit 110 may be provided to any one or more playing devices on the network 260 that support a common protocol and have the necessary security access. As shown, a playing device 210, 280 may be located in the first response unit 110 or in the other response unit 190. These playing devices 210,280 may query the originating device 200 or otherwise initiate the communication. Conversely, the originating device 200 may initiate specific communication to particular playing devices 210, 280 or provide broadcast of informational items to pre-designated playing devices 210, 280. In other words, the system and method of the present invention provides modular components for the dissemination of streaming video.

The features, use and novelty of the present invention may best be understood by considering an exemplary situation and instance in which the various components would be advantageous.

Consider a hostage situation or other similar standoff, in a mall or other structure having multiple corridors, rooms, stairwells, floors, exits and ground areas. It would be advantageous for law enforcement or any other intervening body to have the ability to properly assess the site, and gain as much insight as possible into the current state of affairs. It is likely that such a situation will involve multiple agencies that would also need similar or related information. Originating device 200 of the present invention could have been widely installed in various locations throughout the building and grounds of the mall, or may be present in a patrol car that first arrives at the scene, or may be worn by an officer located inside the mall. The originating device 200, will allow the delivery and review of detailed and quality site informational data, which can include images, sounds, and other environmental information. The streaming video lends itself to collaboration among the various agencies by enabling simultaneous access using the system and methods earlier described. Privacy and the integrity of the site related data is maintained by security measures implemented in the system.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting. Functions and features described herein may be implemented in hardware or software, or any combination of both hardware and software, without departing from the scope of the invention.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

What is claimed is:

1. An apparatus for providing secure streaming multimedia data via a wireless network, from a first response unit to one or more remote playing devices in response to a trigger, the apparatus comprising:

a multimedia component capture source located in the first response unit to acquire visual and audio scene information, wherein said first response unit has a local playing device for receiving and playing scene information irrespective of said trigger;

an analog to digital converter coupled to said capture source, to convert the acquired scene information and provide one or more digital multimedia data items representative of the acquired scene information;

first and second network interface switches adapted for selecting between two or more wireless network interface adapters, said first interface switch located in said first response unit and said second interface switch located in said remote playing device;

an encoding and packetizing module that in response to said trigger provides the secure streaming of multimedia packets of said one or more multimedia data items to the wireless network; and a security module for receiving and validating security criteria provided at said first response unit to thereby enable the secure streaming of said multimedia packets to the wireless network;

said one or more remote playing devices having access to the wireless network and an authentication module to enable security access to said secure multimedia packets to decode said secure multimedia packet and present the acquired visual and audio scene information on said one or more remote playing devices.

2. The apparatus of claim 1, wherein the network is the internet; and wherein said encoding and packetizing module provides a data format for interface to an EVDO router for delivery of the multimedia data to the internet.

3. The apparatus of claim 1, wherein the network is a Mesh network comprising a collection of wireless access points.

4. The apparatus of claim 1, wherein the network is an adhoc wireless network.

5. The apparatus of claim 1 further comprising switching means to enable an end user to select among two or more of the wireless networks for the transmission of said multimedia packets.

6. The apparatus of claim 1 further comprising an infrastructure for serving up video to the one or more playing device clients, the infrastructure comprising a video server having support for multiple and simultaneous access by the one or more playing device clients.

7. The apparatus of claim 1, wherein said encoding and packetizing module comprises a project box having a hardware encoder and software based router, wherein said digital multimedia data items are streamed utilizing EVDO to manage quality of service, and deliver data to the network.

8. The apparatus of claim 1, wherein the trigger is a signal generated by a user located in the first response unit.

9. The apparatus of claim 1, wherein the trigger is a signal generated in response to a request for data from the one or more remote playing devices.

10. The apparatus of claim 1, wherein the trigger is a signal generated in response to a selection of the first response unit from a display of multiple response units and video sources, by an officer located in a second response unit.

* * * * *